L. DE FLOREZ.
PROCESS OF MAKING MOTOR FUEL.
APPLICATION FILED DEC. 4, 1917. RENEWED JUNE 29, 1922.
1,437,045.
Patented Nov. 28, 1922.
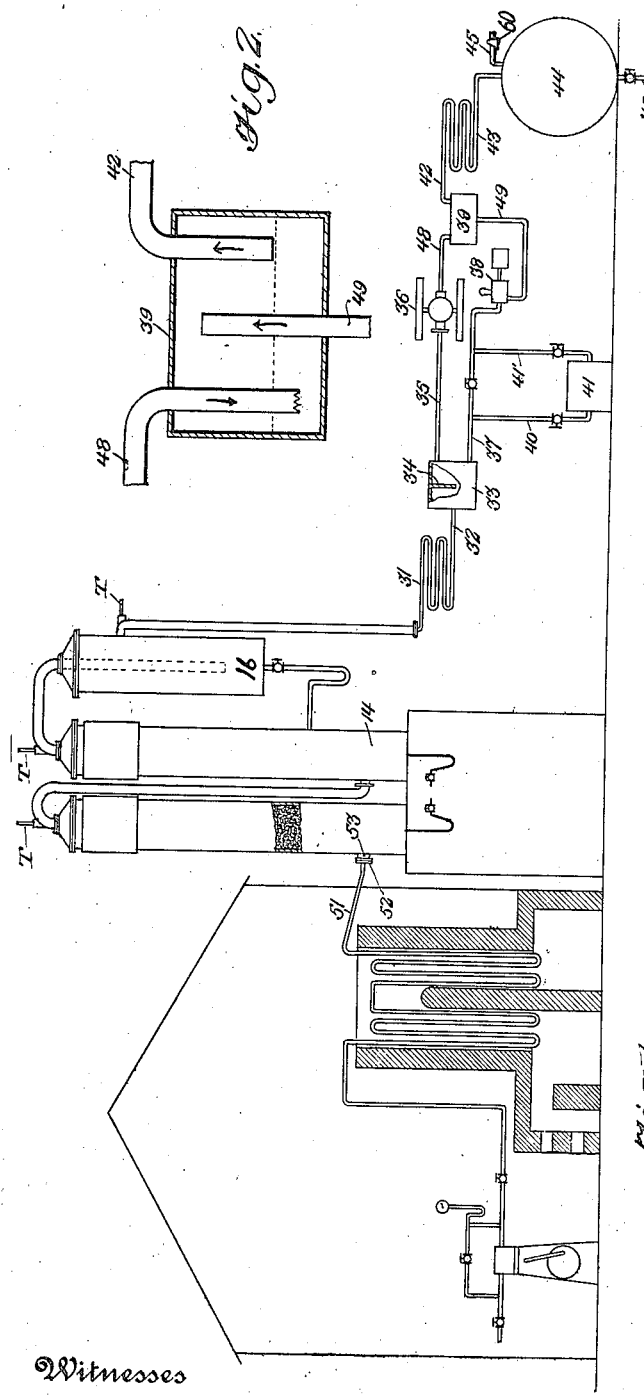
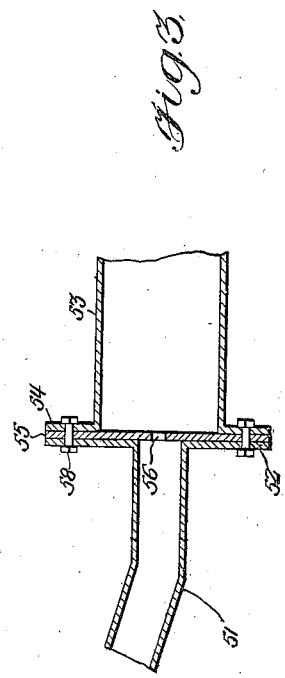
Witnesses
Inventor
Luis de Florez
By A. B. Foster
Attorney Patented Nov. 28, 1922.

1,437,045

UNITED STATES PATENT OFFICE.

LUIS DE FLOREZ, OF SHORT HILLS, NEW JERSEY, ASSIGNOR TO MOTOR PETROL COMPANY, OF NEW YORK, N. Y., A CORPORATION.

PROCESS OF MAKING MOTOR FUEL. REISSUED

Application filed December 4, 1917, Serial No. 205,290. Renewed June 29, 1922. Serial No. 571,768.

*To all whom it may concern:*

Be it known that I, LUIS DE FLOREZ, a citizen of the United States, residing at Short Hills, State of New Jersey, have invented certain new and useful Improvements in Processes of Making Motor Fuel, of which the following is a specification.

The present invention relates to the production of motor fuel by a process constituting an improvement (in point of simplicity) upon that described in William A. Hall Patents 1,175,910 and 1,242,795 and 1,242,796, which patents disclose processes of cracking mineral oil products to produce lighter or more volatile material, such processes involving heating a flowing current of the oil to be cracked, under a superatmospheric pressure of several atmospheres, then cooling the gases and vapors sufficiently to remove heavy oils and solid matter, then raising the pressure of the mixture of gases and vapors and finally cooling under pressure to condense the motor fuel or other product produced.

The accompanying drawings show, more or less diagrammatically, apparatus which may be employed in carrying out the process of my present invention. In said drawings Fig. 1 shows a side elevation partly in section, of an apparatus suitable for carrying out the process, and Fig. 2 shows one form of mixing receptacle which may be employed at 39 (Fig. 1). Fig. 3 shows in detail, on a larger scale, the preferred form of the connection between pipe 51 and pipe 53.

In producing the motor fuel in accordance with my present invention, I pass a gas oil or a similar hydrocarbon oil or distillate, for example that known as "American petrolite", or crude oil, or crude kerosene, or other hydrocarbon oil less volatile than gasoline, through a coil of pipes, heated to a temperature of about 500 or 600° C., in which the material undergoing treatment is maintained under a pressure of about four to six atmospheres (a pressure of 5 atmospheres being particularly suitable in the cracking of crude kerosene of a gravity of .8). I then pass the resulting gases and vapors through dephelgmating apparatus of any suitable construction which may take the form of filled towers, in order to remove the major portion of such materials as are not volatile at the temperature of the cut, say 200° C. (or generally at temperatures from 140 to 220° C.), this cooling operation being performed while the gases and vapors are at a pressure materially below that used in the cracking coils and may be performed at about atmospheric pressure. To this end, the pipe connecting the decomposing coil and the first condenser is provided with a suitable constriction. (See Fig. 3.) After leaving the last dephlegmator, for example that shown at 14 in the accompanying drawings (and after the gases have been passed through a vapor trap 16 if desired), I pass the vapors and gases through a condenser 31, cooled to about atmospheric temperature, say 25 to 30° C., in order to condense practically everything which is non-volatile at this temperature. The gases and liquids then constituting the flowing mixture both contain considerable amounts of unsaturated hydrocarbons, notably olefines and more highly unsaturated hydrocarbons.

The gases and liquids pass through pipe 32 to a trap 33 containing a baffle 34, the gases passing by pipe 35 to a compressor 36, in which they are compressed to about 5 to 7 atmospheres. I preferably do not employ a pressure of materially above 10 atmospheres in this operation, since it is not my intention to produce a liquefaction of such materials as would be liquefied at higher pressures.

The condensate separated from the gases in the trap 33 passes by pipe 37 and pump 38 into a mixing receptacle 39, in which the gases are mixed with the liquid, and partially absorbed thereby. It is sometimes desirable to by-pass the liquid from pipe 37 through a pipe 40, to any suitable refining or treating devices, represented diagrammatically at 41 (which may include chemical purification, absorption of impurities by fuller's earth or the like, fractional distillation or other suitable operations for the removal of any impurities which may be present) after which the liquid passes by pipe 41' back to the pipe 37 and thence to the pump 38, by which the liquid is pumped into the mixer 39, wherein it is mixed with the gases from the compressor 36. The gases may also be purified between 34 and 39 if desired. It is not necessary to employ any catalyst in the mixer 39. The gases and liquids together then pass by pipe 42 into a cooler 43 and into a collecting tank 44 and any unabsorbed gases pass out through pipe 45 past the pressure-reducing valve 60, set at any desired pressure, e. g., 5 to 7 atmospheres, and can be used for heating the retort if desired. The liquid is drawn off by pipe 46, and constitutes the motor fuel. Suitable thermometers are provided at T, for measuring or recording the temperatures.

Fig. 2 shows one form of mixing receptacle 39 which may be employed in carrying out the process. In this form of apparatus the gas under pressure enters by pipe 48 from the compressor 36, and the liquid material condensed in the coil 31 and separated in the trap 33 (either with or without passing through the purifier represented diagrammatically at 41) enters by pipe 49. The mixture of gas and liquid leaves by pipe 42 to the cooling or refrigerating coil 43 (see Fig. 1).

Fig. 3 shows the connection preferably employed between the coil of pipe forming the cracking coil and the pipe leading to the condenser. In said figure 51 illustrates the end of the small pipe of which the cracking coil is constructed, which may be a one-inch pipe. The end of this pipe is provided with a flange 52. 53 is a larger pipe, leading to the first condenser, and this is provided with a flange 54. Between these two flanges is placed the plate 55 which is provided with a small hole 56. Assuming for illustration that the cracking coil and pipe 51 are one-inch (internal diameter) steel pipe, and that oil is being fed into the converter at a rate of three gallons per minute, and that the temperature of the gases and vapors in 51 is about 605° C., and that the pipe 53 is about six inches in internal diameter. To maintain a pressure of about 70 lbs. per square inch in the coil, the plate 55 may be provided with a hole of (say) one-half inch size. A number of plates with different sized holes may be provided, whereby removing the bolts 58 and substituting a plate with a larger or smaller hole, other conditions may be maintained in the cracking coil. This example is given merely by way of example, and without limiting myself to the details thereof.

I desire to state that I do not claim anything shown or described in the W. A. Hall patents above referred to.

The present case contains matter disclosed in my prior application 90,388 filed April 11, 1916.

It is sometimes advantageous to line or partly fill the pipe 53 with a suitable catalyst, e. g., one containing over 50% of carbon and less than 50% of iron, as described and claimed in my copending application 90,387, filed April 11, 1916. This feature is optional in the process constituting the present invention.

What I claim is:

1. A process of making motor fuel which comprises (a) cracking under a superatmospheric pressure of several atmospheres and at an elevated temperature, a flowing current of hydrocarbon material containing fractions not sufficiently volatile to serve as constituents of motor fuel, (b) removing from the gases and vapors substantially the entire amount of those fractions having boiling points above about 200° C., while at a pressure below that used in the cracking operation, and while leaving in the vapor state, substantially the entire amount of material volatile at such temperature, (c) cooling the remaining mixture of gases and vapors to about atmospheric temperature, to condense the major portion of the vapors as a light liquid, (d) compressing the remaining gases to a pressure not over about ten atmospheres, (e) and absorbing the same in said light liquid while under approximately that pressure.

2. A process of making motor fuel which comprises (a) cracking a hydrocarbon oil containing fractions having boiling points above those of ordinary gasolene, while under a pressure of about four to six atmospheres, (b) removing from the gases and vapors the major portion of those fractions having boiling points above 200° C., while at a pressure materially below that used in the cracking operation, (c) cooling the remaining mixture of gases and vapors to about atmospheric temperature while at such reduced pressure, to condense the major portion of the vapors, and thereby produce a light liquid, (d) purifying said light liquid, (e) compressing the remaining gases to a pressure of not over about ten atmospheres, and (f) absorbing the same in said light liquid, while under superatmospheric pressure.

3. In the production of motor fuel the step of bringing together a cracked hydrocarbon liquid containing no considerable quantities of fractions of which the boiling points are above about 200° C., and a cracked hydrocarbon gas, such liquid and such gas both containing substantial amounts of unsaturated hydrocarbons, at not below atmospheric temperature, and at a superatmospheric pressure of about 5 to 7 atmospheres, in the absence of a catalyst, and thereafter cooling the mixture.

4. In the production of motor fuel the step of bringing together a refined cracked hydrocarbon liquid containing no considerable quantities of fractions of which the boiling points are above about 200° C., and a cracked hydrocarbon gas, such liquid and such gas both containing substantial amounts of unsaturated hydrocarbons, at not below atmospheric temperature, and at a superatmospheric pressure of about 5 to 7 atmospheres, in the absence of a catalyst, and thereafter cooling the mixture.

5. In the production of motor fuel, the steps of (*a*) cracking a mineral oil containing fractions having boiling points above the boiling point range of ordinary gasoline, by subjecting the same to a cracking temperature while under a pressure of several atmospheres, (*b*) cooling the resulting gases and vapors to not below about 200° C. and separating the condensate, (*c*) cooling the remaining gases and vapors to normal atmospheric temperature, (*d*) treating the condensate of step *c* with the uncondensed gases while under a pressure of about four to six atmospheres, while out of contact with the condensate of step *b*.

6. In the production of motor fuel, the step of mingling under a pressure of not over ten atmospheres, and at approximately normal atmospheric temperature, a cracked hydrocarbon liquid, substantially all of which is volatile at 200° C., and which contains considerable amounts of unsaturated hydrocarbons, and hydrocarbon gases containing considerable amounts of unsaturated hydrocarbons, in the absence of a catalyst.

In testimony whereof I affix my signature.

LUIS DE FLOREZ.